United States Patent
Ritter et al.

(10) Patent No.: US 7,923,965 B2
(45) Date of Patent: Apr. 12, 2011

(54) METHODS FOR COUPLING AN ENERGY STORAGE SYSTEM TO A VARIABLE ENERGY SUPPLY SYSTEM

(75) Inventors: Allen Michael Ritter, Roanoke, VA (US); Cyrus David Harbourt, Roanoke, VA (US); Robert Gregory Wagoner, Roanoke, VA (US)

(73) Assignee: General Electric Company, Schenectady, NY (US)

( * ) Notice: Subject to any disclaimer, the term of this patent is extended or adjusted under 35 U.S.C. 154(b) by 635 days.

(21) Appl. No.: 11/247,836

(22) Filed: Oct. 10, 2005

(65) Prior Publication Data

US 2007/0080666 A1 Apr. 12, 2007

(51) Int. Cl.
*H02J 7/00* (2006.01)
(52) U.S. Cl. ......... 320/127; 320/128; 320/135; 320/137
(58) Field of Classification Search .................. 320/128, 320/127, 135, 137
See application file for complete search history.

(56) References Cited

U.S. PATENT DOCUMENTS

| | | | |
|---|---|---|---|
| 4,362,791 A | 12/1982 | Kaneko | |
| 4,786,567 A | 11/1988 | Skyllas-Kazacos et al. | |
| 5,225,712 A | 7/1993 | Erdman | |
| 5,610,802 A | 3/1997 | Eidler et al. | |
| 6,468,688 B2 | 10/2002 | Kazacos et al. | |
| 6,562,514 B1 | 5/2003 | Kazacos et al. | |
| 6,809,431 B1 | 10/2004 | Schippmann | |
| 6,930,460 B2 * | 8/2005 | Ishikawa et al. | 318/442 |
| 6,984,897 B2 * | 1/2006 | Skeist et al. | 290/44 |
| 7,265,456 B2 * | 9/2007 | Hennessy | 290/44 |
| 2002/0198648 A1 * | 12/2002 | Gilbreth et al. | 701/100 |
| 2003/0230334 A1 * | 12/2003 | Chang et al. | 136/244 |
| 2005/0028520 A1 * | 2/2005 | Chertok | 60/517 |
| 2005/0147871 A1 * | 7/2005 | Shigematsu et al. | 429/50 |
| 2006/0171086 A1 * | 8/2006 | Hennessy et al. | 361/62 |

OTHER PUBLICATIONS

U.S. Appl. No. 11/035,922, filed Jul. 21, 2005.
U.S. Appl. No. 11/032,280, filed Jul. 21, 2005.
U.S. Appl. No. 11/035,466, filed Jul. 21, 2005.
U.S. Appl. No. 10/512,273, filed Jul. 7, 2005.
U.S. Appl. No. 11/048,388, filed Aug. 3, 2006.
U.S. Appl. No. 10/495,139, filed Apr. 7, 2005.
U.S. Appl. No. 11/234,778, filed Mar. 29, 2007.

* cited by examiner

*Primary Examiner* — Bao Q Vu
*Assistant Examiner* — Nguyen Tran
(74) *Attorney, Agent, or Firm* — Armstrong Teasdale LLP

(57) ABSTRACT

A method for coupling an energy storage system to a variable energy supply system includes providing an energy storage system including at least one Vanadium redox battery and at least one battery charge controller. The method also includes electrically coupling the at least one battery charge controller to the variable energy supply system such that the at least one battery is configured to supply a substantially consistent energy output during fluctuating energy loads of the energy supply system.

7 Claims, 2 Drawing Sheets

METHODS FOR COUPLING AN ENERGY STORAGE SYSTEM TO A VARIABLE ENERGY SUPPLY SYSTEM

BACKGROUND OF THE INVENTION

This invention relates generally to energy storage systems, and more particularly, methods and apparatus for coupling an energy storage system to a variable energy supply system.

At least some known wind generation systems produce a fluctuating or intermittent power output due to the variability of wind speed. When multiple generators are electrically coupled together, i.e. in arrangements known as wind farms, the fluctuation in total power output may be reduced. Under ideal conditions the variations of power output will decrease at a factor of $1/\sqrt{n}$, where n represents the number of wind generators coupled together. In areas where wind penetration may be high, coupling a large number of generators generally reduces the overall power fluctuations on a system wide basis, but may still cause power swing stability concerns. Generally the volatile nature of wind generation output limits the amount of wind generation that can be connected to the grid without causing voltage stability problems. As such, wind power generation is generally considered a non-firm resource for system planning purposes.

It is well known that the demand for electric power fluctuates. Normally power fluctuations occur on a relatively regular basis. For example, in a typical residential electric power grid, generally demand for electric power is low at night, peaks during the morning, levels out during the day, and peaks again in the late afternoon. However, there are circumstances where the demand for electric power suddenly and irregularly increases. From the perspective of an electric power utility company, the associated increase in electric power demand occasioned during such occasions may be difficult to accommodate because the electric power demand are generally short lived.

For example, at least some known electric energy storage systems include banks of electric batteries. Known battery installations are used to provide electric power in emergency or power-failure circumstances, but generally can not be used to provide supplemental power during demand peaks. For example, known lead-acid batteries are used as standby power sources that may provide emergency lighting and/or standby power sources for telephone exchanges. However, such batteries either do not have adequate electric energy storage capacity to meet the demands of energy storage systems, or are expensive. To facilitate accommodating short lived electric power demand increases, at least some known electric power transmission system are coupled to electric energy storage system to an so that the energy storage system may be utilized, or turned on, to provide additional electric power during peak demand.

BRIEF DESCRIPTION OF THE INVENTION

In one aspect, a method for coupling an energy storage system to a variable energy supply system is provided. The method includes providing an energy storage system including at least one Vanadium redox battery and at least one battery charge controller. The method also includes electrically coupling the at least one battery charge controller to the variable energy supply system such that the at least one battery is configured to supply a substantially consistent energy output during fluctuating energy loads of the energy supply system.

In another aspect, a power system for supplying power to a grid is provided. The system a variable energy supply system and a plurality of grid interface units electrically coupled to the variable energy supply system via an electrical bus. The system also includes a Vanadium redox battery electrical storage system configured to store power from the variable energy supply system and supply power to the grid.

In a further aspect, an electrical storage system is provided. The system includes a Vanadium redox battery electrical storage system and a battery charge controller in electrical communication with the battery and a variable energy supply system. The controller is configured to direct electrical power from the variable energy supply system to at least one of the battery and/or a utility power grid.

DETAILED DESCRIPTION OF THE INVENTION

The present invention is directed to a vanadium-based reduction/oxidation (redox) regenerative energy storage system that converts chemical energy into electrical energy for use with wind generation systems. While the invention is described and illustrated in the context of a wind turbine power system, the invention is not limited to wind turbine power systems. The embodiments set forth herein are therefore exemplary only and represent various embodiments of the invention, but are not conclusive of all embodiments. As explained below, these embodiments contribute towards allowing power generating systems to store energy, as well as, provide supplemental power to an electric power grid during demand peaks or store during off-peak times.

Figure 1:
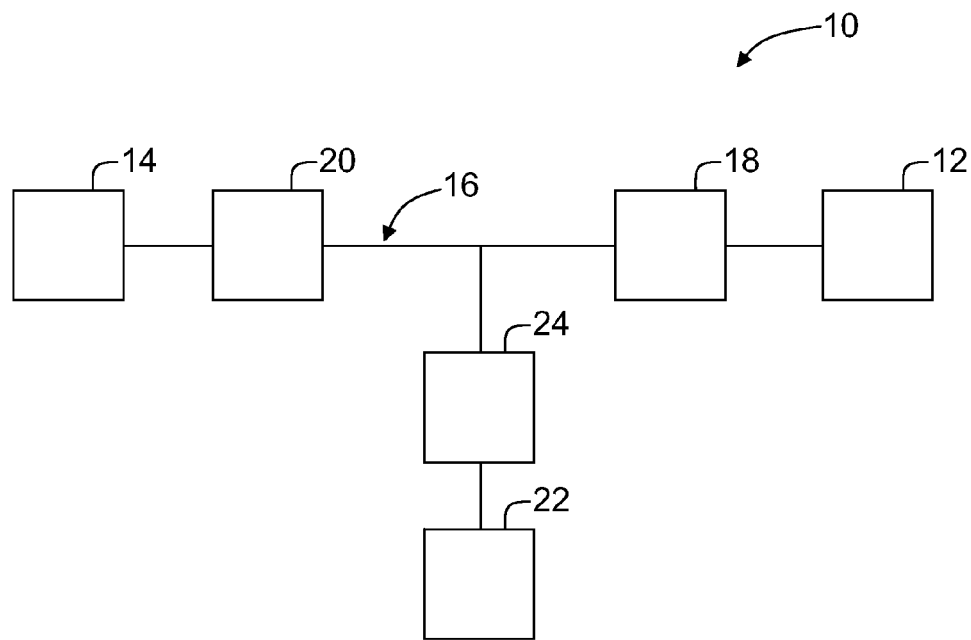
FIG. 1 is a schematic view of an exemplary wind turbine power system.

FIG. 1 is a schematic of a wind turbine power system 10 including a wind turbine generator 12 coupled in electrical communication with a power utility grid 14. In the exemplary embodiment, wind turbine generator 12 provides power to grid 14 via a bus 16 including a grid interface unit 18 and a grid interface unit 20. Wind turbine generator 12 also provides power for a critical load 22 coupled in series to bus 16 via a grid interface unit 24. In the exemplary embodiment, wind turbine generator 12 is a 2.7 MW wind turbine generator, bus 16 is a 1100 VDC common DC bus, grid interface device 18 is a 2.7 MW AC/DC inverter, grid interface device 20 is a 3 MVA bidirectional AC/DC, DC/AC inverter, and grid interface 24 is a 100 KW DC/AC inverter. While system 10 is efficient during high wind speeds, it is less efficient during fluctuating or intermittent wind speeds and thus power output to grid system 14 varies due to the variability of the wind speed.

Figure 2:
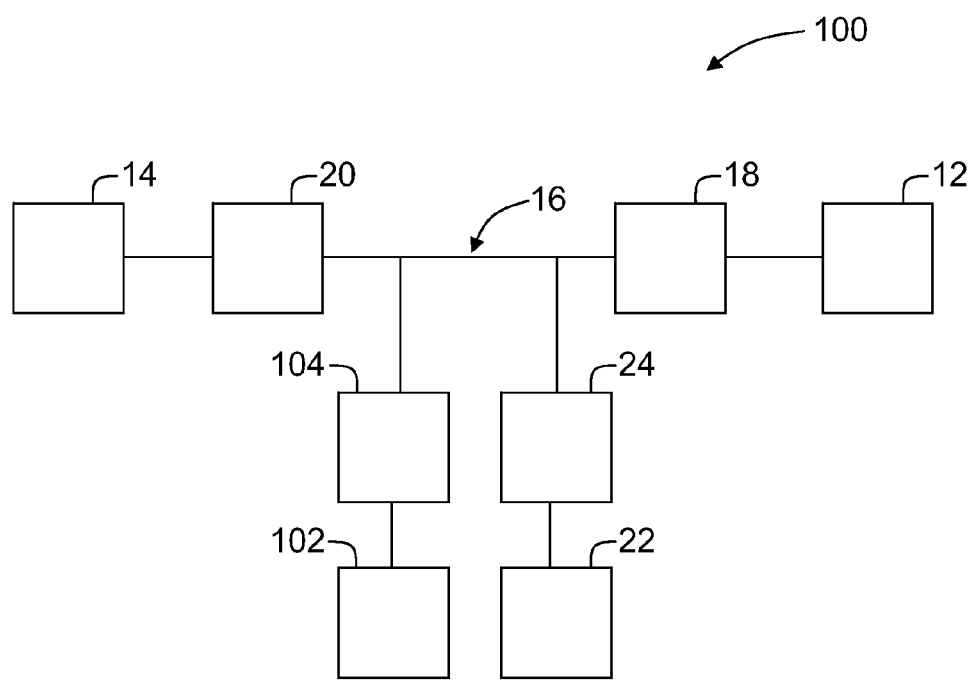
FIG. 2 is a schematic view of an exemplary wind turbine power system including an energy storage system.

FIG. 2 is a schematic view of an exemplary embodiment wind turbine power system 100 including an energy storage system 102. Wind turbine power system 100 is substantially similar to wind turbine power system 10, (shown in FIG. 1) and components of wind turbine power system 100 that are identical to components of wind turbine power system 10 are identified in FIG. 2 using the same reference numerals used in FIG. 1.

Energy storage system 102 is coupled in electrical communication to bus 16 between wind turbine generator 12 and grid interface system 14 via a battery charge controller 104. In the exemplary embodiment, energy storage system 102 is a vanadium redox battery-electrical storage system (VRB-ESS) 102 and controller 14 is a 3 MW DC/DC bidirectional buck/boost converter.

In the exemplary embodiment, VRB-ESS 102 serves as a buffer between variable supply sources such as wind turbine generator 12 and the firm competitive requirements of a power contract such as grid 14. In alternative embodiments, VRB-ESS 102 adds capacity value to non-firm resources such as wind and Photo-voltaic (PV). One to one response time makes it capable of charging and discharging over the same duration. VRB-ESS 102 also provides stabilization of wind turbine output and is a source of reactive energy.

VRB-ESS 102 facilitates storing energy in multi megawatt ranges and for durations of hours or days—from any available input source. The stored energy can then be provided back to grid interface unit 20 or supplied to critical load 22 as required and directed. VRB-ESS 102 is configured to supply steady power in times when the wind is varying, and to continue to supply power for a period of time when the wind is gone altogether.

VRB-ESS 102 is uniquely capable of being charged as quickly as it is discharged and is able to respond to all forms of power quality variations and so can be operated in a UPS mode as well. For loads which require reactive energy, VRB-ESS 102 is fully rated to provide volt-amperes reactive (VARS) at nameplate on a continuous basis either when charging or discharging. And as such, VRB-ESS 102 is configured to store bulk power storage in a DC link of a converter in a system utilizing multiple interleaved insulated gate bipolar transistors (IGBT) converters to convert the battery voltage to AC.

In the exemplary embodiment, controller 104 is configured to facilitate directing any extra power from wind turbine generator 12 to charge VRB-ESS 102, to backup critical load 22, and/or to power grid 14. Controller 104 is also configured to facilitate preventing VRB-ESS 102 from over-charging.

Figure 3:
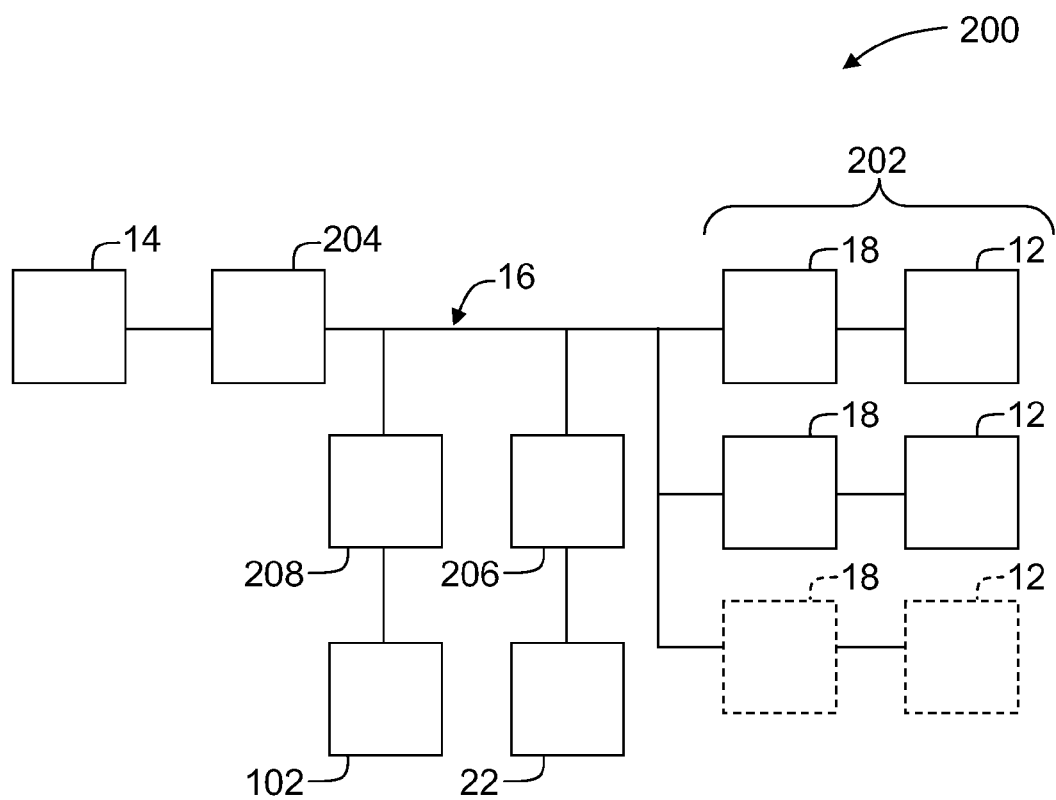
FIG. 3 is a schematic view of an exemplary embodiment of a multiple wind turbine power system.

FIG. 3 is schematic view of an exemplary embodiment of a multiple wind turbine power system 200 including a plurality of wind turbine generators 202 coupled in parallel configuration. Wind turbine power system 200 is substantially similar to wind turbine power system 100, (shown in FIG. 2) and components of wind turbine power system 200 that are identical to components of wind turbine power system 100 are identified in FIG. 3 using the same reference numerals used in FIG. 2.

In the exemplary embodiment, wind turbine generators 202 provide power to grid 14 via bus 16 including grid interface unit 18 and a grid interface unit 204. Wind turbine generators 202 also provide power to critical load 22 via grid interface unit 206. In the exemplary embodiment, each wind turbine generator 12 is a 2.7 MW wind turbine generator, bus 16 is a 1000 VDC common DC bus, grid interface device 18 is a 2.7 MW AC/DC inverter, grid interface device 204 is a 9 MVA bidirectional AC/DC, DC/AC inverter, and grid interface 206 is a 300 KW DC/AC inverter. System 200 also includes a VRB-ESS 102 coupled in electrical communication to bus 16 via a battery charge controller 208. In the exemplary embodiment, controller 208 is a 9 MW DC/DC bidirectional buck/boost converter.

As utilized within the present invention, VRB-ESS 102 facilitates serving several functions. During power failures, provides power to pitch control systems to adjust blade pitch as needed. Furthermore, most power systems are also configured with an uninterruptible power system (UPS), VRB-ESS 102 is configured to provide power to the UPS as backup power to auxiliary loads.

Another advantage of these configurations is the "dynamic braking" energy is handled by the battery storage system. In the exemplary embodiment, VRB-ESS 102 and controller 104 are configured to absorb the entire wind turbine generator 12 output power for dynamic braking. This function is ordinarily handled by dissipating the power in large resistors. VRB-ESS 102 facilitates eliminating these very large resistors and is more efficient than the resistors.

The above-described invention provides a cost-effective and reliable method for coupling an energy storage system to a variable energy supply system to be able to facilitate supplying a consistent energy output during fluctuating energy demands, storing energy in times of strong wind, and continuing to provide power when the wind speed is low. Positioning a VRB-ESS in a wind turbine power system facilitates directing extra power from a wind turbine generator to store power in the VRB-ESS, to backup critical loads, and/or to power a utility grid. Furthermore, the VRB-ESS facilitates absorbing output power for dynamic braking.

Exemplary embodiments of a VRB-ESS are described above in detail. The VRB-ESS is not limited to the specific embodiments described herein, but rather, components of each system may be utilized independently and separately from other components described herein. For example, VRB-ESS can also be used in combination with other variable energy supply systems, and is not limited to practice with only wind generator turbines as described herein. Rather, the present invention can be implemented and utilized in connection with many other generators and variable energy supply systems.

While the invention has been described in terms of various specific embodiments, those skilled in the art will recognize that the invention can be practiced with modification within the spirit and scope of the claims.

What is claimed is:

1. A method for coupling an energy storage system to a variable alternating current energy supply system having a direct current (DC) bus side, said method comprising:
   providing an energy storage system including at least one Vanadium redox battery and at least one battery charge controller, wherein the at least one battery charge controller has a DC bus side and a battery side that is coupled to the at least one battery, the at least one battery charge controller including a DC/DC converter; and
   electrically coupling the DC bus side of the at least one battery charge controller to the DC bus side of the variable alternating current energy supply system such that the at least one battery is configured to supply a substantially consistent energy output to at least one of a utility grid and a critical load when an input to the variable alternating current energy supply system prevents the variable alternating current energy supply system from generating the substantially consistent energy output, wherein the at least one battery charge controller and the at least one battery are configured to absorb an entire output power of the variable alternating current energy supply system as needed for dynamic braking within the variable alternating current energy supply system.

2. A method in accordance with claim 1 wherein providing the at least one battery charge controller comprises providing a bidirectional buck and boost converter.

3. A method in accordance with claim 1 wherein the variable alternating current energy supply system comprises a wind turbine generator system including at least one alternating current wind turbine generator.

4. A method in accordance with claim 1 wherein coupling the battery charge controller to the variable alternating current energy supply system further comprises coupling the battery charge controller to the variable alternating current energy supply system such that an output from the variable alternating current energy supply system above the substantially consistent energy output of the variable alternating current energy supply system charges the at least one battery.

5. A method in accordance with claim 1 wherein coupling the battery charge controller to the variable alternating current energy supply system further comprises coupling the battery charge controller to a wind turbine generator system such that electrical power is provided to a wind turbine pitch control system in the event of a pitch control system failure.

6. A method in accordance with claim 5 wherein coupling the battery charge controller to the variable alternating current energy supply system further comprises providing electrical power to the critical load, from the at least one Vanadium redox battery, when wind speed is below a level that allows the wind turbine generator system to generate the substantially consistent energy output.

7. A method in accordance with claim 1 wherein coupling the battery charge controller to the variable alternating current energy supply system further comprises storing bulk power in a Vanadium redox battery coupled to a plurality of interleaved IGBT converters to convert the battery voltage to AC and storing bulk power in a DC link within the converters.

* * * * *

UNITED STATES PATENT AND TRADEMARK OFFICE
CERTIFICATE OF CORRECTION

| | | |
|---|---|---|
| PATENT NO. | : 7,923,965 B2 | Page 1 of 1 |
| APPLICATION NO. | : 11/247836 | |
| DATED | : April 12, 2011 | |
| INVENTOR(S) | : Ritter et al. | |

It is certified that error appears in the above-identified patent and that said Letters Patent is hereby corrected as shown below:

Column 3, line 53, delete "1000 VDC" and insert therefor -- 1100 VDC --.

Signed and Sealed this
Fourteenth Day of February, 2012

David J. Kappos
*Director of the United States Patent and Trademark Office*